March 12, 1963  B. R. BALDWIN  3,080,771
VIBRATION DAMPING MECHANISM
Filed March 28, 1960
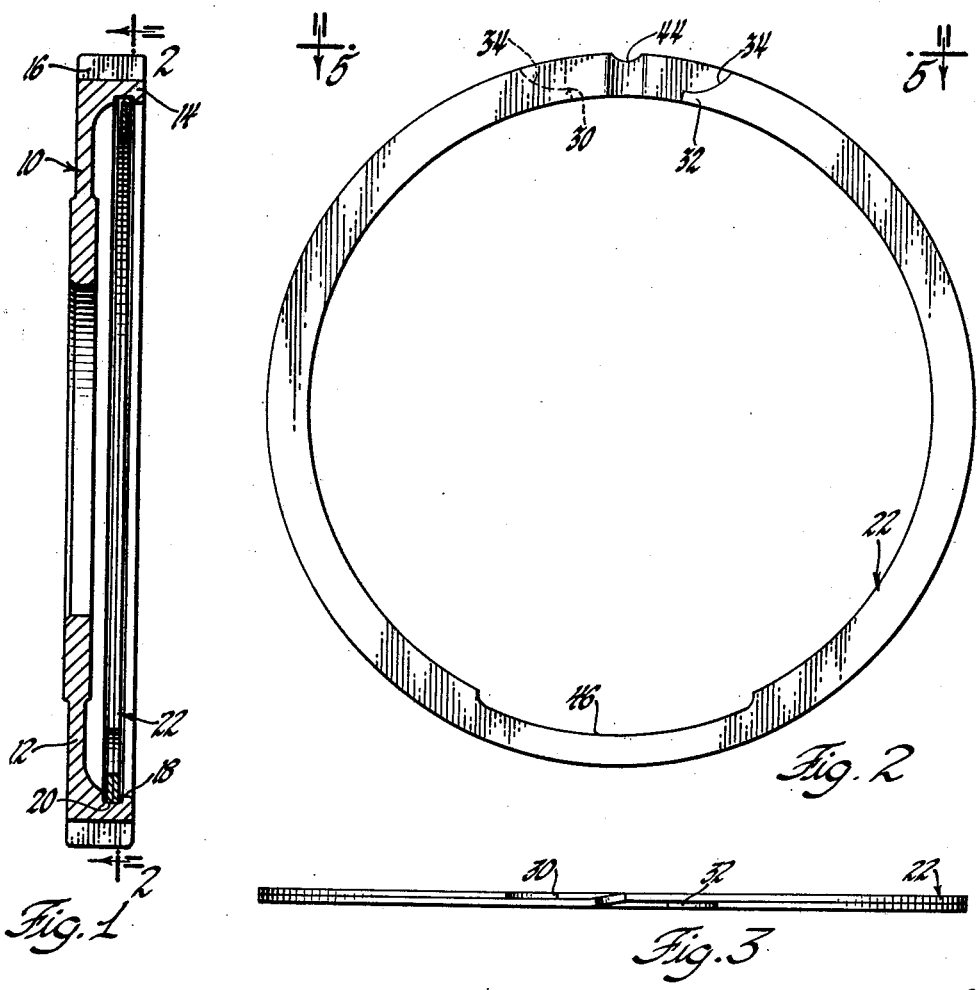
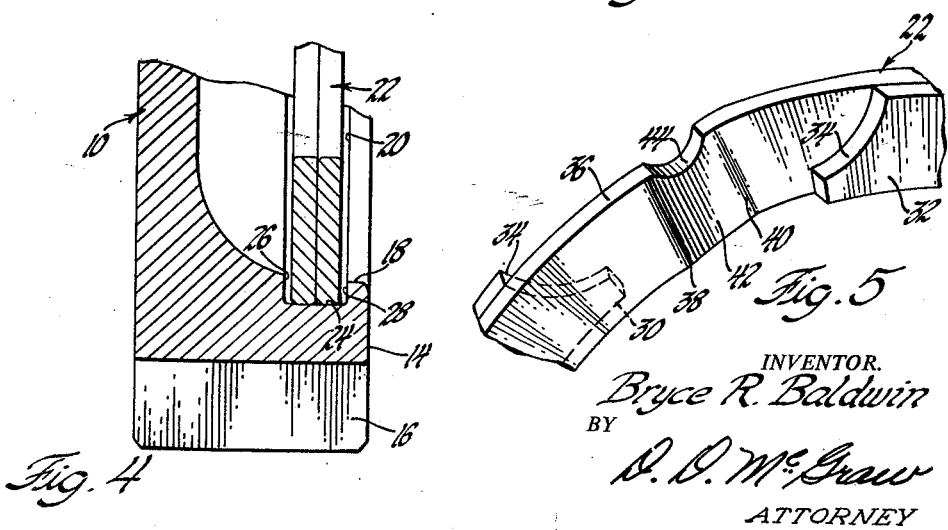
INVENTOR.
Bryce R. Baldwin
BY
D. D. McGraw
ATTORNEY United States Patent Office 3,080,771
Patented Mar. 12, 1963

3,080,771
VIBRATION DAMPING MECHANISM
Bryce R. Baldwin, Indianapolis, Ind., assignor to General Motors Corporation, Detroit, Mich., a corporation of Delaware
Filed Mar. 28, 1960, Ser. No. 17,828
3 Claims. (Cl. 74—574)

The invention relates to a vibration damping ring and an assembly comprising a rotatable member such as a gear or wheel which requires vibration damping and uses the damping ring. It is quite common to use gears or wheels which have a rim or bell section in which vibrations are set up during operation. It has been well known to provide a damping ring in engagement with the inner periphery of the rim in order to counteract these vibrations. In the past such damping rings have been solid and annularly formed so that they appear somewhat like a typical washer. They are usually inserted into a shallow groove formed in the inner periphery of the rim by expanding the rim under heat and contracting the ring. After the ring is installed and the ring and rim reach the same temperature, the ring is held within the groove.

This method of installation is time consuming and does not always result in a satisfactory installation. In some instances the ring is made of a different material from the gear or wheel and at elevated operating temperatures may become loose. The ring also may become accidentally dislodged since the groove in which it is installed must be relatively shallow in order to permit this type of installation.

It has also been suggested that a ring similar to a snap ring be used to permit easier installation. Such rings have not proven entirely satisfactory since their spaced end construction does not provide the requisite vibration damping characteristics. Such rings are also easily dislodged since they may be removed by a simple cantilever type force applied against one end.

A vibration damping ring and assembly embodying the invention does not require the heat expansion installation method and at the same time overcome the objections to the snap ring type damper. The vibration damping ring is helically formed from a strip of metal or other suitable material so as to have substantially two helical convolutions. A deeper groove than heretofore used in heat expansion installations may be provided in the rim of the gear or wheel and the ring may be installed by starting one end of it in the groove and rotating the ring until it is entirely within the groove. If a thicker vibration damper ring is required, more than two convolutions may be provided. In either case it has been found that this type of ring provides greater vibration damping than the solid ring or snap ring earlier used and the use of a deeper groove insures more positive ring retention.

In the drawing:
FIGURE 1 is a cross section view of an assembly embodying the invention.
FIGURE 2 is a view of the vibration damping ring portion of the assembly of FIGURE 1 taken in the direction of arrows 2—2 of that figure.
FIGURE 3 is a view of the ring of FIGURE 2 taken in the direction of arrows 3—3 of that figure.
FIGURE 4 is an enlarged section of a portion of the assembly of FIGURE 1, with parts broken away.
FIGURE 5 is an isometric view of a portion of the vibration damping ring of FIGURE 1, with parts broken away.

The invention is illustrated in the assembly of FIGURE 1 as being used with a gear 10 having a web 12 and a rim section 14 on which the gear teeth 16 are formed. The invention is equally applicable to similar assemblies such as a wheel or any other rotatable member which may require vibration damping. The rim 14 of the gear 10 has an annular inner peripheral surface 18 in which an annular groove 20 is formed. The vibration damping ring 22 embodying the invention is received in groove 20. In its normal position ring 22 tightly engages the groove bottom surface 24 and may either engage or be slightly spaced from the groove shoulders 26 and 28.

Ring 22 is helically formed on a continuous strip of any suitable material such as steel so that it has two substantially complete cylindrical helix convolutions. If a heavier ring is desired without increasing the ring radius, additional convolutions may be provided. The diameter of the outer periphery of the ring is preferably such that the ring will fit tightly within the groove 20 when installed.

The material from which the ring convolutions are formed is preferably flat and has first and second ends 30 and 32 which may be positioned arcuately adjacent each other and spaced arcuately apart for a small distance. Each of the ends 30 and 32 may be undercut at 34 on the outer periphery thereof to permit easy assembly and disassembly of the ring with the gear 10. A portion 36 of one convolution intermediate the ends 30 and 32 may be crimped or bent at 38 and 40 so that it tends to overlap the ends 30 and 32 in the manner best seen in FIGURE 3. The crimp or bends 38 and 40 may be substantially along radii of the ring 22. This construction permits the ring ends 30 and 32 to be immediately adjacent each other while keeping the maximum ring axial thickness to twice the axial thickness of one convolution when the ring is made with two closed convolutions. Under some circumstances, it may be desirable to form the ring with slightly open convolutions so that the ring exerts an axial spring force against portions of the shoulders 26 and 28 and further tends to hold the ring in the desired position.

In order to prevent oil from being trapped between the ring 22 and the gear 10, a section of the crimped area 42 is undercut at 44 to provide an axially extending groove which will permit oil to flow outwardly under centrifugal force along the rim surface 18. Since the ring ends 30 and 32 do not meet and therefore the ring is not in balance, or, if the ends 30 and 32 extend to the crimped portion 42 and slightly overlap, but a ring unbalance is still in effect because of the groove 44, the ring may be undercut diametrically opposite the crimped section 42 as illustrated by the groove 46. Groove 46 is preferably formed on the inner periphery of the ring rather than the outer periphery due to stress considerations, although it may be formed on the outer periphery if circumstances warrant it.

The ring may be installed by starting end 30, for example, in groove 20, and rotating the ring until it is contained entirely within the groove. It may be removed in a similar manner by first moving end 32, for example, radially inward then axially and rotationally so as to thread the ring out of the groove 20. By using this installation and removal procedure groove 20 may be formed deeper than a similar groove in which the heat expansion method is used, thus insuring more positive ring retention.

What is claimed is:
1. In a rotatable member having a rim portion capable of periodic vibrations with a relatively deep annular groove formed on said rim portion adjacent the edge thereof and said groove having vibration damper means therein, said vibration damper means comprising a continuous circular coil of more than one turn and generally of uniform cross section, said coil terminating in free ends spaced circumferentially from each other without overlap, and said coil having a portion opposite said ends and of lesser cross section than the rest of said coil to balance out the unbalance resulting from the circumferential spacing of said free ends.

2. The device as described in claim 1 wherein said portion of lesser cross section is a groove formed on the inner periphery of said coil.

3. The device as described in claim 2 and in addition said coil having an axially extending oil relief groove formed in a surface thereof equidistant from said free ends and being of a radial depth exceeding the depth of said annular groove whereby an oil passage from one side of said coil to the other is provided.

References Cited in the file of this patent

UNITED STATES PATENTS

| | | |
|---|---|---|
| 1,761,023 | Pontis | June 3, 1930 |
| 2,450,425 | Frisby | Oct. 5, 1948 |
| 2,605,132 | Watter | July 29, 1952 |
| 2,985,054 | Bramberry et al. | May 23, 1961 |

FOREIGN PATENTS

| | | |
|---|---|---|
| 191,429 | Great Britain | Jan. 10, 1923 |
| 273,145 | Great Britain | June 30, 1927 |
| 307,456 | Germany | Aug. 28, 1818 |
| 445,124 | Great Britain | Apr. 3, 1936 |
| 846,858 | Germany | Aug. 18, 1952 |
| 854,367 | Germany | Nov. 4, 1952 |
| 891,951 | Germany | Oct. 1, 1953 |